(12) United States Patent
Johnson et al.

(10) Patent No.: US 9,279,949 B2
(45) Date of Patent: Mar. 8, 2016

(54) ZERO STRESS FIBER OPTIC FLUID CONNECTOR

(71) Applicant: BAE Systems Information and Electronic Systems Integration Inc., Nashua, NH (US)

(72) Inventors: Benjamin R. Johnson, Nottingham, NH (US); David P. Kelly, Nashua, NH (US); Michael J. Shaw, Concord, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/649,584

(22) PCT Filed: Oct. 2, 2014

(86) PCT No.: PCT/US2014/058810
§ 371 (c)(1),
(2) Date: Jun. 4, 2015

(87) PCT Pub. No.: WO2015/051108
PCT Pub. Date: Apr. 9, 2015

(65) Prior Publication Data
US 2015/0309275 A1 Oct. 29, 2015

Related U.S. Application Data

(60) Provisional application No. 61/886,692, filed on Oct. 4, 2013.

(51) Int. Cl.
*G02B 6/44* (2006.01)
*G02B 6/42* (2006.01)
*G02B 6/38* (2006.01)

(52) U.S. Cl.
CPC ............ *G02B 6/4407* (2013.01); *G02B 6/3814* (2013.01); *G02B 6/4268* (2013.01); *G02B 6/4436* (2013.01); *G02B 6/4477* (2013.01); *G02B 6/4296* (2013.01)

(58) Field of Classification Search
CPC .. G02B 6/4296; G02B 6/3814; G02B 6/4407; G02B 6/4477; G02B 6/4268
See application file for complete search history.

(56) References Cited

U.S. PATENT DOCUMENTS

| 5,381,501 | A  | 1/1995  | Cardinal et al. |
|-----------|----|---------|-----------------|
| 5,619,602 | A  | 4/1997  | Sandstrom et al. |
| 5,827,267 | A  | 10/1998 | Savage et al.   |
| 6,409,391 | B1 | 6/2002  | Chang           |

(Continued)

OTHER PUBLICATIONS

PCT/US14/058810, IRS mailed on Jan. 7, 2015.

*Primary Examiner* — Michelle R Connelly
*Assistant Examiner* — Hoang Tran
(74) *Attorney, Agent, or Firm* — Daniel J. Long; Sand & Sebolt

(57) ABSTRACT

A system and method for passing a fiber cable through a fiber connector is presented. A fiber connector includes an outer body and a series of flutes inside the outer body. The outer body forms an interior chamber that has a first opening and a second opening. The first opening allows a coolant to flow into the first opening and the first and second openings allow the fiber cable to pass through the first opening and the second opening and through the fiber connector. A series of flutes are attached to an inner surface of the outer body and extend into the interior chamber. The flutes are spaced apart from each other and extend from the inner surface toward the fiber cable but do not touch the fiber cable when no liquid is flowing in the fiber connector.

20 Claims, 2 Drawing Sheets

(56) References Cited

U.S. PATENT DOCUMENTS

| | | | |
|---|---|---|---|
| 2004/0194513 A1* | 10/2004 | Giacobbe | C03B 37/02718 65/512 |
| 2009/0310917 A1 | 12/2009 | Roos et al. | |
| 2014/0050448 A1* | 2/2014 | Konishi | G02B 6/3624 385/100 |

* cited by examiner

ZERO STRESS FIBER OPTIC FLUID CONNECTOR

BACKGROUND OF THE INVENTION

1. Field of Invention

The current invention relates generally to apparatus, systems and methods related to fiber optic cables. More particularly, the apparatus, systems and methods relate to cooling fiber optic cables. Specifically, the apparatus, systems and methods provide for a low stress connector used in a cooling system to cool fiber optic cables.

2. Description of Related Art

Typical fiber optic connectors use an epoxy or mechanical clamp to secure an optical fiber within a connector. The possible disadvantages of this approach may involve a permanent bonding, or the bonding may impart physical stress to the fiber. Stress on the optical fiber changes the optical waveguide characteristics of the fiber, leading to undesirable outcoupling of radiation from the fiber to the polymer coating on the final cladding of the fiber. Excess out-coupling of radiation in high power fiber lasers leads to a thermal failure of the polymer coating, cascading to total fiber laser failure, often times catastrophic. Long term, low magnitude stresses on the fiber can decrease the total lifetime of the laser through slow degradation of the polymer coating.

Typical fiber laser fabrication is conducted in discrete, sequential steps. This build process allows for mistakes in the manufacturing to be corrected immediately. A highly integrated fiber laser requires the parallel success of each fabrication step. The seating of the fiber laser into the Connector/Cable assembly is the last step in laser fabrication. A manufacturing mistake jeopardizes the entire laser. What is needed is a better fiber optic cable connector.

SUMMARY

One aspect of an embodiment of the invention includes a fiber connector that allows a fiber connector to pass through the fiber connector. A fiber connector includes an outer body and a series of flutes inside the outer body. The outer body forms an interior chamber that has a first opening and a second opening. The first opening allows a coolant to flow into the first opening and the first and second openings allow a fiber cable to pass through the first opening and the second opening and through the fiber connector. A series of flutes are attached to an inner surface of the outer body and extend into the interior chamber. The flutes are spaced apart from each other and extend from the inner surface toward the fiber cable but do not touch the fiber cable when no liquid is flowing in the fiber connector.

In one aspect another embodiment may provide for a method of using a fiber connector. The method begins by pulling a fiber cable through a fiber connector so that the fiber cable extends through a first opening in the fiber connector and extends through a second opening in the fiber connector. The fiber cable also passes through a series of flutes within the fiber connector. The series of flutes are located between the first and second openings and extend from an inner wall of the fiber connector toward the fiber cable. The flutes are concave in shape as viewed from the first opening. The method flows a coolant into the fiber connector to cool the fiber cable. Some configurations of this embodiment allow for spacing the plurality of flutes apart to allow eddy current to be formed between the flutes when flowing the coolant into the fiber connector to distribute the total energy required to cease flow within the fiber connector.

BRIEF DESCRIPTION OF SEVERAL VIEWS OF THE DRAWINGS

One or more example embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3 illustrates an example system in which the example embodiment of a fiber connector can be used in.

Similar numbers refer to similar parts throughout the drawings.

DETAILED DESCRIPTION

Figure 1:
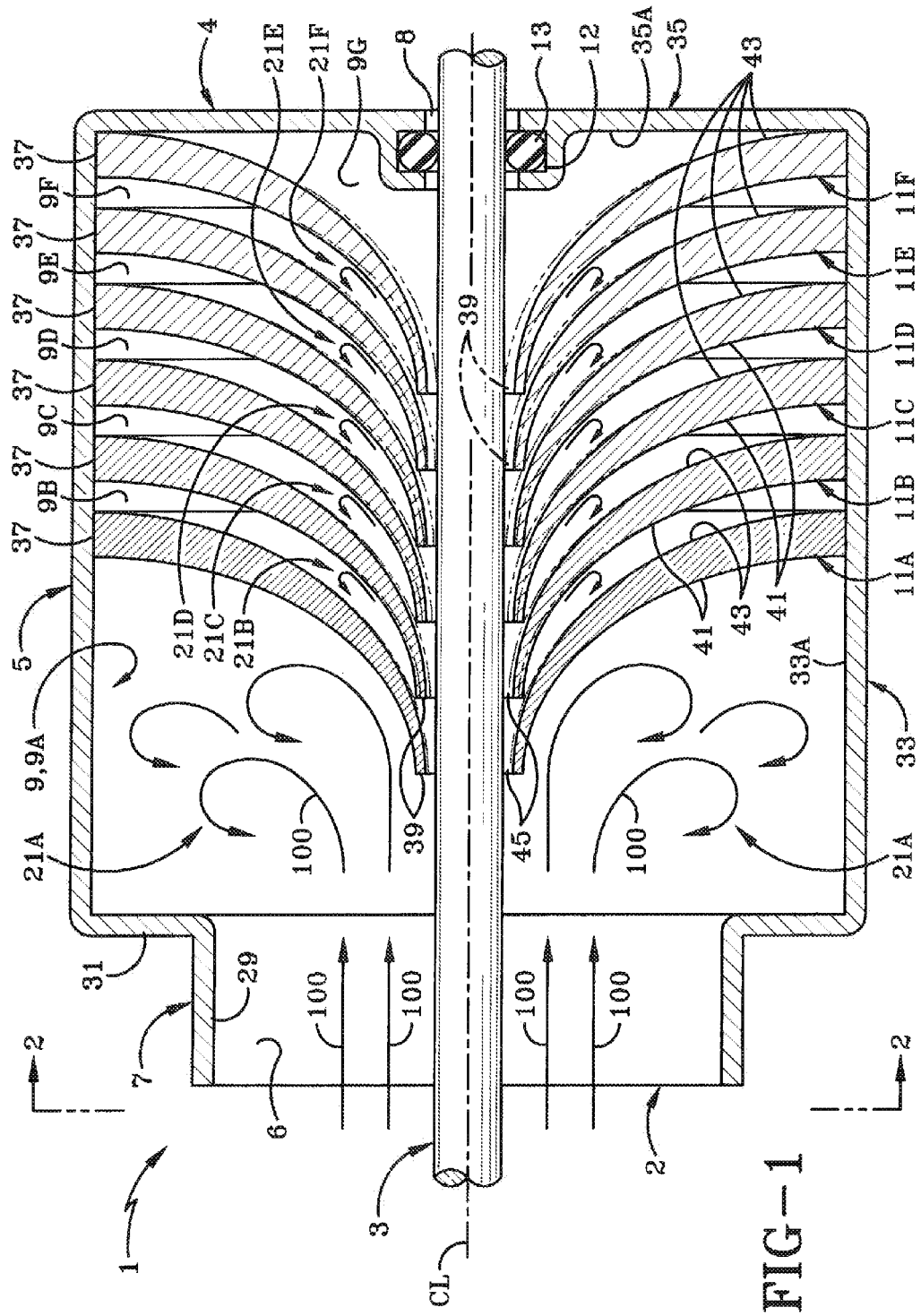
FIG. 1 illustrates an example embodiment of a fiber connector that is an example side cross section of the fiber connector and a fiber optic cable with flutes for dispersing the force of a cooling fluid to allow for a low to no stress interface between the fiber connector and the fiber optic cable.
Figure 2:
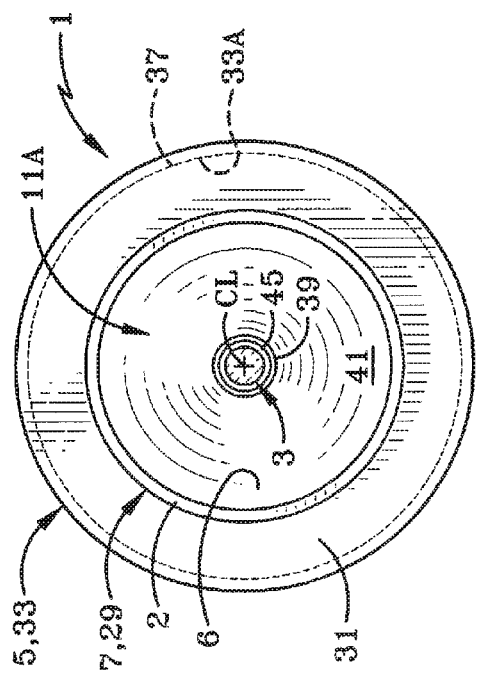
FIG. 2 illustrates an example cross-sectional view of the fiber connector.

FIG. 1 illustrates the example embodiment of a fiber connector 1. In the example embodiment, the fiber connector 1 is a low stress or even a zero stress connector meaning that it places low stress on an optical fiber 3 shown passing through it. The fiber connector 1 has a left end 2 and a right end 4 with an end wall 35 having an inner surface 35A located at the right end 5. In the example embodiment, the fiber connector 1 is generally cylindrical in shape as understood by viewing FIGS. 1 and 2 together. The fiber connector 1 has a main cylindrical portion 5 and smaller cylindrical connector portion 7. The main cylindrical portion 5 includes an annular wall 33 having an inner surface 33 and the smaller cylindrical connector portion 7 has an annular wall 29. A vertical wall 31 connects the main cylindrical portion 5 and the smaller cylindrical connector portion 7. The main cylindrical portion 5 and smaller cylindrical connector portion 7 form a main chamber 9 into which a coolant 100 (as discussed later) flows into the smaller cylindrical connector portion 7 through an opening 6. The smaller cylindrical connector portion 7 can also be formed with threads so that it can be threadably connected to another cooling pipe/conduit or another device. Alternatively, it can be formed with structures so that it can be connected to another "push-to-connect" connector or the cylindrical connector portion 7 can be formed with a compression fitting for connecting to another plumbing device or it can form to connect to other fittings as understood by those of ordinary skill in the art.

The fiber connector 1 further includes a series of eddy flutes 11A-F. These eddy flutes 11A-F, as discussed later, are used to create liquid flow disruption of a coolant in the main chamber 9 as well as chambers 9A-G between the flutes 11A-F to distribute force on the optical fiber 3. The flutes 11A-F are shaped as cones that have curved surfaces with a hole passing through their centers with the optical fiber 3 passing through these holes. The flutes 11A-F are made out of various materials so that flute 11A is more ridged/hard/strong that flute 11B and the flute 11B is more ridged than flute 11C and so on with flute 11F being the less ridged. The grayscale of the flutes 11A-F in FIG. 1 indicates the relative rigidity/ strength of each flute in relation to each other. The dashed lines adjacent the edges of each flute 11A-F indicate example deflection of each flute in response to impingement with a cooling fluid as discussed below.

As viewed from the connector portion 7 side, the flutes 11A-F have a concave shape that includes curved upstream surfaces 41 as well as curved downstream surfaces 43. Additionally, the thickness of each flute 11A-F is thickest at an end 37 where they are attached to the surface 33A of the main cylindrical portion 5 and this thickness decreases moving away from the main cylindrical portion 5 before reaching a thinnest end 39 of each flute 11A-F at the central opening/hole 45 of each flute 11A-F.

The fiber connector 1 may further include an O-ring 13. The O-ring is "doughnut" shaped with a hole in its center where the optical fiber 3 passes through. The O-ring 13 is placed near the right side 4 and can be made out of rubber, a polymer or another material as understood by those of ordinary skill in the art. The O-ring 13 prevents any fluid from leaking from the chamber 9 out the right side 4 of the fiber connector 1. The O-ring can be located in an annular groove 12 formed on the back wall/surface 35/35A as illustrated.

Figure 3:
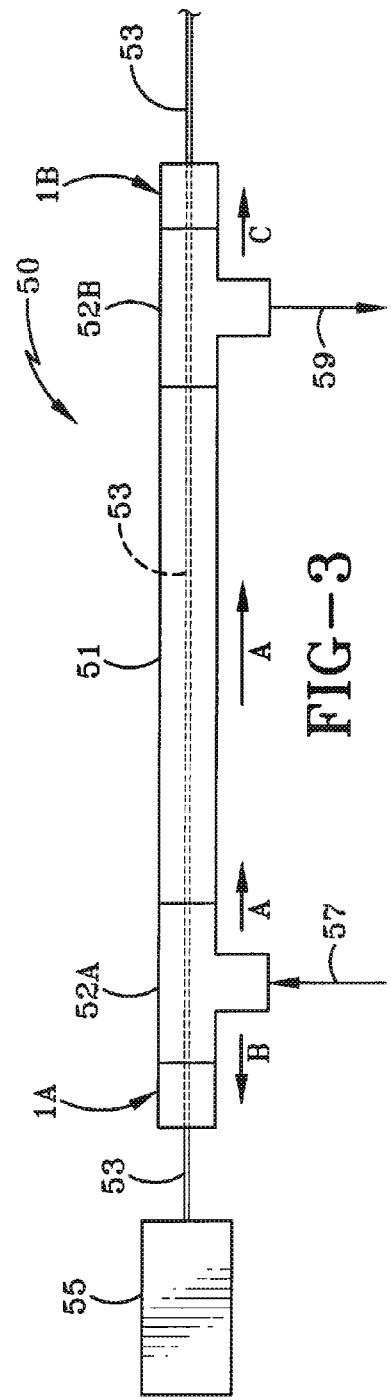

FIG. 3 illustrates one example environment where the fiber connector 1 may be used. The system 50 in this environment includes a central conduit 51 with plumbing 1-connectors 52A-B connected to each end of the conduit 51. Fiber connectors 1A and 1B are connected to each of the T-connectors 52A-B as illustrated. These connectors 1A-B are the same as the fiber connector 1 described above. A fiber optic cable 53 passes through these components as illustrated. A laser 55 is connected to one end of the fiber optic cable 53.

Having described the components of the fiber connector 1, its use and operation will now be described. Referring initially to FIG. 3, in operation the system 50 will inject a cooling liquid 57 into one end of T-connector 52A and a majority of this liquid will flow in the direction of arrow A. However, some/a small part of this liquid will flow in the direction of arrow B toward fiber connector 1A. When the bulk of the coolant reaches T-connector 52B most of it flows outward as a partially warmed coolant 59 because heat was transferred to it from the fiber optic cable 53. Some of the coolant will flow past the T-connector 52B in the direction of arrow C and enter fiber connector 1B. Re-cooled cooling fluid is circulated through the central conduit 51 in this way to cool the fiber optic cable 53.

The operation of the fiber connector 1 of FIG. 1 is now described as it oriented similar to fiber connector 1B of FIG. 3. Fiber connector 1 uses a series of flutes 11A-F of varying stiffness that disrupt the flow of coolant towards the connector 1 into eddy currents 21A-F that terminate about the flute 1B. Only eddy currents for the first three flutes 11A-C are illustrated and labeled but there may be smaller eddy currents between the other flutes 11D-F. Each eddy current 21A-F absorbs the energy of the incoming fluid through the deflection of some or all the flutes 11A-F. As the coolant passes past each flute 11A-F, the formation of eddy currents 21A-F result in a subsequent drop in effective pressure on each flute 11A-F. These pressure drops result in a situation where the final O-ring 13 seals the fiber connector 1B without imparting radial stress to achieve full encapsulation. With the appropriate choice in flute material, the final flutes (approximately flutes 11D-F) may flex towards the fiber 3, creating an axial seal about the outer-most surface of the fiber 3 as the flowing fluid applies pressure to the flutes (approximately 11D-F). This is a self-sealing connector 1B that effectively distributes the total energy required to cease flow within the connector 1B to the deflection of each flute 11A-F and the generation of turbulent eddy currents 21A-F at each flute 11A-F.

Another benefit to the zero stress fiber optic fluid connector 1 is that because of the non-permanent manner in which the connector interacts with the fiber 3, it allows for the fiber 3 to be removed and reused, while not damaging the integrity of the fiber 3.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the example embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the example embodiment" does not necessarily refer to the same embodiment, though it may.

What is claimed is:

1. A fiber connector comprising:
    an outer body with an interior chamber, a first opening and a second opening; wherein the first opening allows a coolant to flow into the first opening and the first and second openings allow a fiber cable to pass through the first opening and the second opening; and
    a plurality of flutes attached to an inner surface of the outer body and extending into the interior chamber, wherein the plurality of flutes are spaced apart from each other and extend from the inner surface toward the fiber cable but do not touch the fiber cable when no liquid is flowing in the fiber connector.

2. The fiber connector of claim 1 wherein the plurality of flutes are conical in shape with curved surfaces with central openings to allow the fiber cable to pass through the plurality of flutes.

3. The fiber connector of claim 1 wherein a first flute closest to the first opening has a first flexibility, wherein a second flute between the first flute and the second opening has a second flexibility that has more flexibility than the first flute, and wherein a third flute between the second flute and the second opening has a third flexibility that has more flexibility than the second flute.

4. The fiber connector of claim 1 wherein the closer a specific flute is to the second opening the more flexibility the specific flute has as compared to other flutes further away from the second opening.

5. The fiber connector of claim 1 wherein the plurality of flutes are concave in shape as viewed from the first opening and are convex in shape as viewed from the second opening.

6. The fiber connector of claim 5 wherein the flute closest to the first opening has a stiffness to prevent the flute closest to first opening from deflecting and touching the fiber cable when a coolant is flowing in the fiber connector.

7. The fiber connector of claim 5 wherein the flute closest to the second opening has a flexibility to allow the flute closest to second opening to deflect and touching the fiber cable when a coolant is flowing in the fiber connector.

8. The fiber connector of claim 1 wherein the plurality of flutes have thick side wall thickness where the plurality of flutes are attached to the inner surface of the outer body and have side wall thickness that decreases moving away from the inner surface of the outer body.

9. The fiber connector of claim 1 wherein the plurality of flutes are formed out of one or more of the group of: a rubber, a polymer and a plastic.

10. The fiber connector of claim 1 wherein the main body is generally cylindrical in shape.

11. The fiber connector of claim 10 wherein the main body further includes:
a cylindrical connector portion that is cylindrical in shape and forms the first opening, wherein the cylindrical connector portion forms a smaller cylindrical shape than the main body.

12. The fiber connector of claim 11 wherein the cylindrical connector portion is shaped so that the fiber connector is attachable to another device by one of the group of: screw on threads, a push-to-connect connector and compression fitting.

13. The fiber connector of claim 1 wherein the main body is formed with one or more of the group of: a metal, a polymer and a plastic.

14. The fiber connector of claim 1 further comprising:
an O-ring located adjacent a wall where the second opening is formed; wherein the fiber cable passes through the O-ring, and wherein the O-ring prevents coolant from escaping the wall when coolant is flowing in the fiber connector.

15. The fiber connector of claim 1 wherein the O-ring is formed out of at least one of the group of: a rubber and a polymer.

16. A method comprising:
pulling a fiber cable through a fiber connector so that the fiber cable extends through a first opening in the fiber connector and extends through a second opening in the fiber connector, wherein the cable passes through a plurality of flutes within the fiber connector, wherein the plurality of flutes are located between the first and second openings, wherein the plurality of flutes extend from an inner wall of the fiber connector toward the fiber cable, and wherein the plurality of flutes are concave in shape as viewed from the first opening; and
flowing a coolant into the fiber connector to cool the fiber cable.

17. The method of claim 16 further comprising:
spacing the plurality of flutes apart to allow eddy current to be formed between the flutes when flowing the coolant into the fiber connector to distribute the total energy required to cease flow within the fiber connector.

18. The method of claim 16 further comprising:
selecting a material of at least the flute closest to the second opening so that the at least the flute closest to the second opening deflects to touch the fiber cable when a coolant is flowing in the fiber connector to create an axial seal about an outer-most surface of the fiber cable.

19. The method of claim 16 further comprising:
removing the fiber cable from the fiber connector; and reusing the fiber cable in a different system.

20. The method of claim 16 further comprising:
placing an O-ring around the fiber cable and placing the O-ring adjacent a wall forming the second opening to prevent the coolant from exiting the second opening.

* * * * *